United States Patent [19]

Wick

[11] E Patent Number: Re. 32,730

[45] Reissued Date of Patent: Aug. 16, 1988

[54] LAWN MOWER BLADE CLUTCH AND BRAKE

[75] Inventor: Gerald H. Wick, Galesburg, Ill.

[73] Assignee: Outboard Marine Corporation, Waukegan, Ill.

[21] Appl. No.: 68,672

[22] Filed: Aug. 22, 1979

Related U.S. Patent Documents

Reissue of:

[64] Patent No.: 4,044,533
Issued: Aug. 30, 1977
Appl. No.: 690,632
Filed: May 27, 1976

[51] Int. Cl.[4] ..... A01D 69/10; F16D 69/00

[52] U.S. Cl. ..... 56/11.3; 192/17 R

[58] Field of Search ..... 56/11.3, 10.5; 192/17 R

[56] References Cited

U.S. PATENT DOCUMENTS

| | | | |
|---|---|---|---|
| 2,167,171 | 7/1939 | Dodge | 188/77 R |
| 2,675,103 | 4/1954 | Weber | 192/17 C |
| 2,825,434 | 4/1953 | Smitzer | 192/18 |
| 2,875,858 | 3/1959 | Dunham | 188/77 R |
| 3,026,665 | 3/1962 | Hoff | 188/77 R |
| 3,228,177 | 1/1966 | Coates | 56/10.5 |
| 3,253,391 | 5/1966 | Meldahl | 56/11.3 |
| 3,290,871 | 12/1966 | Haas | 56/10.5 |
| 3,461,994 | 8/1969 | Dallman et al. | 192/17 R |

FOREIGN PATENT DOCUMENTS

| | | |
|---|---|---|
| 2158591 | 6/1973 | France . |
| 4286978 | 6/1971 | Japan . |

*Primary Examiner*—Paul J. Hirsch
*Attorney, Agent, or Firm*—Michael, Best & Friedrich

[57] ABSTRACT

Disclosed herein is a lawn mower comprising a blade housing supported for travel over the ground, a drive shaft mounted for rotation by the blade housing and including thereon a clutch drum, an engine drivingly connected to the drive shaft for rotation thereof, a cutter blade located in the blade housing and mounted for rotation coaxially with and relative to the drive shaft, a clutch shoe connected to the cutter blade for common rotation therewith and for movement relative to a position of engagement with the clutch drum, a spring urging the clutch shoe into the position of engagement, a brake surface fixed to the clutch shoe, and a brake member movable between a first position wherein the brake member is spaced from the brake surface, and a second position wherein the brake member engages the brake surface to brake rotation of the cutter blade and to displace the clutch shoe from the position of engagement against the action of the spring.

58 Claims, 2 Drawing Sheets

LAWN MOWER BLADE CLUTCH AND BRAKE

Matter enclosed in heavy brackets [ ] appears in the original patent but forms no part of this reissue specification; matter printed in italics indicates the additions made by reissue.

BACKGROUND OF THE INVENTION

The invention relates generally to rotary lawn mowers and more particularly to rotary lawn mowers including a clutch operable to engage and disengage a cutter blade with respect to a prime mover. Still more particularly, the invention relates to rotary lawn mowers in which cutter blade rotation is simultaneously braked incident to disengagement of the clutch.

Attention is directed to the Hoff U.S. Pat. No. 3,026,665 issued Mar. 27, 1962 and to the Meldahl U.S. Pat. No. 3,253,391 issued May 31, 1966. *Attention is further directed to the Weber U.S. Pat. No. 2,675,103 issued Apr. 13, 1954.*

SUMMARY OF THE INVENTION

The invention provides a lawn mower comprising a blade housing supported for travel over the ground, a drive shaft mounted for rotation by the blade housing and including thereon, a clutch drum, an engine drivingly connected to the drive shaft, a clutch shoe connected to the cutter blade for common rotation therewith and for movement relative to a position of engagement with the clutch drum, biasing means urging the clutch [show] *shoe* into the position of engagement, a brake surface fixed to the clutch shoe, [and] a brake member movable between a first position wherein the brake member is spaced from the brake surface, and a second position wherein the brake member engages the brake surface to brake rotation of the cutter blade and to displace the clutch shoe from the position of engagement against the action of the biasing means[.], *and means biasing the brake member to the second position and normally overpowering the clutch shoe biasing means.*

The invention also provides a combined brake and clutch mechanism comprising a drive member mounted for rotation and including thereon a clutch drum, a driven member carried for rotation coaxially with and relative to the drive member, a clutch shoe connected to the driven member for common rotation therewith and for movement relative to a position of engagement with the clutch drum, biasing means for urging the clutch shoe toward the position of engagement, a brake surface fixed to the clutch shoe, [and] a brake member movable between a first position wherein [th] *the* brake member is spaced from the brake surface, and a second position wherein the brake member engages the brake surface to brake rotation of the driven member and to displace the clutch shoe from the position of engagement against the action of the biasing means[.], *and means biasing the brake member to the second position and normally overpowering the clutch shoe biasing means.*

[In one embodiment of the invention, there is also provided means biasing the brake member to the second position.]

In one embodiment of the invention, there is also provided manual means for overpowering the brake member biasing means so as to displace the brake member to the first position.

In one embodiment of the invention, there is also provided a second clutch shoe located in diametrically opposite relation to said first mentioned clutch shoe and connected to the cutter blade for common rotation therewith and for movement relative to a position of engagement with the clutch drum, and the *clutch shoe* biasing means also biases the second clutch shoe to a position of engagement with the clutch drum and comprises a pair of springs each acting, at one end, against the first mentioned clutch shoe and each acting, at the other end, against the second clutch shoe.

In one embodiment of the invention, the clutch drum is located radially outwardly of the clutch shoe and extends in generally parallel relation to the axis of drive shaft rotation and the brake surface is located radially outwardly of and in generally parallel relation to the clutch drum. It is preferred that the brake surface constitute one leg of an L-shaped member which includes a second leg extending radially inwardly and fastened to the clutch shoe.

One of the principal features of the invention is the provision of a lawn mower including a combined clutch and brake mechanism which serves simultaneously to brake the cutter blade and to disengage a centrifugal clutch driving the cutter blade from a prime mover.

Another of the principal features of the invention is the provision of a lawn mower including a centrifugal clutch which drivingly connects a prime mover to a cutter blade and which includes a clutch shoe connected to the cutter blade and biased by a spring into engagement with a clutch drum driven by the prime mover, together with a brake surface connected to the clutch shoe and engageable by a brake band so as simultaneously to brake cutter blade rotation and disengage the clutch shoe from the clutch drum against the action of the spring.

Another of the principal features of the invention is the provision of a lawn mower including a mechanism for automatically disengaging a combined clutch and brake mechanism, as specified in either of the two preceding paragraphs, in the absence of the maintenance of an operating lever adjacent to a handle bar by an operator.

Other features and advantages of the embodiments of the invention will become known by reference to the following general description, claims, and appended drawings.

THE DRAWINGS

Figure 2:
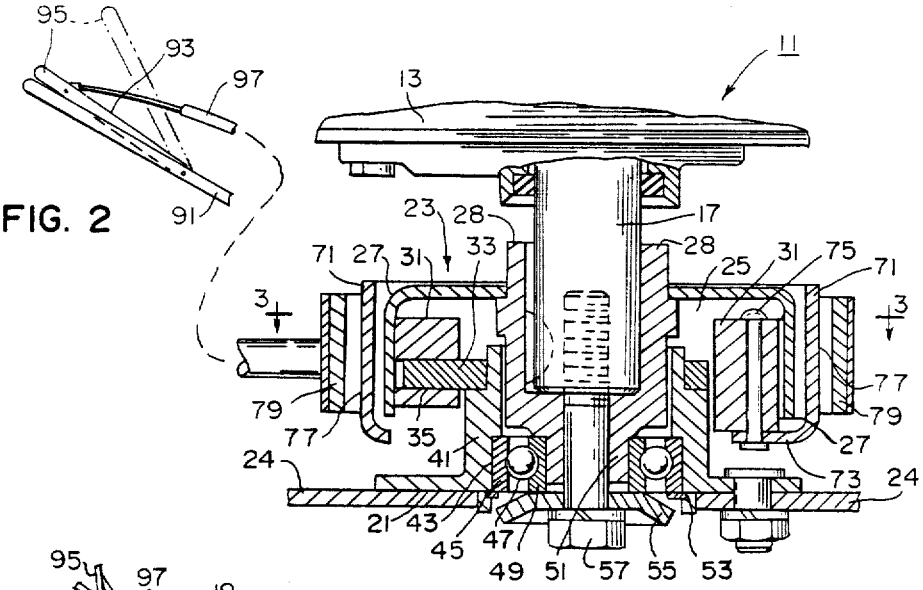
FIG. 2 is an enlarged view, partially schematic and partially in section, of a combined clutch and brake mechanism embodied in the lawn mower shown in FIG. 1.
Figure 1:
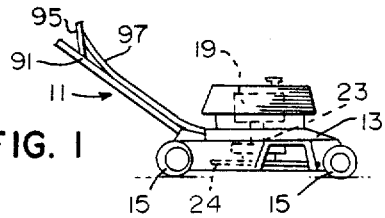
FIG. 1 is an elevational view of a lawn mower embodying various of the features of the invention.

Before explaining the embodiments of the invention in detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

GENERAL DESCRIPTION

Shown in the drawings is a lawn mower 11 including a blade housing 13 which can be supported for travel over the ground in any suitable way, as for instance, by being slung under a tractor or forming a part of a riding mower.

In the illustrated construction, the blade housing 13 is supported by a plurality of wheels 15.

Rotatably supported by the blade housing 13 is a drive shaft or member 17 which can be driven in various ways, as for instance, by a remote engine. In the illustrated construction, the drive shaft 17 constitutes the lower end portion of the crank shaft of an internal combustion engine 19 mounted on the blade housing 13.

Located within the cutter blade housing 13 for relative rotation coaxially with the drive shaft 17, is a cutter blade assembly or driven member 21 which includes a cutter blade 24 rotating within the blade housing 13 and which is connected to the drive shaft 17 by a combined clutch and brake mechanism 23.

More specifically, the illustrated combined clutch and brake mechanism 23 includes a centrifugal clutch 25 including a clutch drum 27 and connected hub 28 which are keyed to and extend fixedly from the drive shaft 17.

Engagable with the clutch drum 27 are one or more clutch shoes 31 (two diametrically oppositely located shoes in the disclosed construction) which clutch shoes 31 are part of the cutter blade assembly 21 and are guided for radial movement by respective upper and lower guide surfaces 33 and 35 respectfully extending radially outwardly from a hub 41.

Means are provided for rotating the clutch shoes 31 in common with the cutter blade 24 while permitting radially inward and outward movement of the clutch shoes 31 relative to positions of engagement with the clutch drum 27. In the illustrated construction, such means comprises formation of each of the clutch shoes 31 with radially inwardly open notches 37 which receive drive tangs 39 extending from the hub 41 which is fixed to the cutter blade 34 and which forms a part of the cutter blade assembly 21.

As already indicated, means are provided for rotatably mounting the cutter blade 24 (and connected parts) within the blade housing 13 for coaxial rotation relative to the drive shaft 17. In the illustrated construction, the hub 41 includes a counterbore 43 which receives one race 45 of a bearing 47 having a second race 49 engaged with a shoulder 51 on the hub 28. The bearing race 45 is retained within the hub 41 by a retaining ring 53 while the bearing race 49 is retained on the shoulder 51 on the hub 28 by a washer 55 and a headed bolt and lockwasher 57 which is axially threaded into the drive shaft 17 after passing through the hub 28.

Means are provided for biasing the clutch shoes 31 into engagement with the clutch drum 27 so as to effect rotation of the cutter blade 24 in response to rotation of the drive shaft 17. In the illustrated construction, such means comprises a pair of springs 61 which, at one end, are received in recesses 63 in one of the end portions of the clutch shoes 31 and which, at the other end, are received in recesses 65 in the other of the end portions of the clutch shoes 31.

Means in the form of a brake mechanism 70 are provided for braking the cutter blade 24 against the rotation and for simultaneously overpowering the clutch shoe biasing means so as to disengage the clutch shoes 31 from the clutch drum 27. In the illustrated construction, such means comprises respective brake elements 71 which are respectively fixed to each of the clutch shoes 31 and which are generally of L shape including one leg 73 secured to the associating clutch shoe 31 by one or more fasteners 75 and a second generally semicylindrical leg or braking surface 77 which extends in generally parallel and radially outwardly relation to the clutch drum 27. The means for braking the cutter blade 24 also includes a brake band or member 79 which is movably carried, at one end thereof, on a fixed pivot 81 extending from the blade housing 13 and which extends in generally encircling, radially outwardly adjacent relation to the braking legs 77.

The brake band 79 is movable between a first position spaced from the braking legs or braking surfaces 77 so as to permit unhindered rotation of the cutter blade 24 and a second position engaging the braking legs or braking surfaces 77 so as to brake rotation of the cutter blade 24 and to simultaneously displace the clutch shoes 31 radially inwardly against the action of the clutch shoe biasing means or springs 61 and out of engagement with the clutch drum 27.

Means are provided for biasing the brake band 79 to the position braking rotation of the cutter blade 24 and displacing the clutch shoes 31 away from the clutch drum 27. In the illustrated construction, such means comprises a helical spring 85 connected, at one end thereof, to an anchor 87 extending from the blade housing 13 and, at the other end thereof, to the other or free end of the brake band 79.

The lawn mower 11 also includes means for steering thereof such as, for instance, the handle bar of a riding mower. In the illustrated construction, such means includes a handle 91 extending upwardly and rearwardly from the blade housing 13.

Means are provided for manually over-riding the brake band biasing means. In the illustrated construction, such means comprises a hand operated lever 93 which is movably mounted on the handle 91 and which includes a hand operated part 95 movable between a position adjacent to the handle 91 and a position spaced from the handle 91. The over-riding means also includes a linkage 97 connecting the lever 93 to the brake band 79 such that the spring 85 is also effective to locate the hand operated part 95 in the position spaced from the handle 91. Thus, whenever the hand operated part 95 is not held by the operator against or adjacent to the handle 91, the combined clutch and brake mechanism 23 will operate to disengage the clutch 25 and brake rotation of the cutter blade 24 notwithstanding engine rotation. Furthermore the engine 19 can be started without causing rotation of the cutter blade 24 when the hand operated lever part 95 is located in the spaced position.

Figure 3:
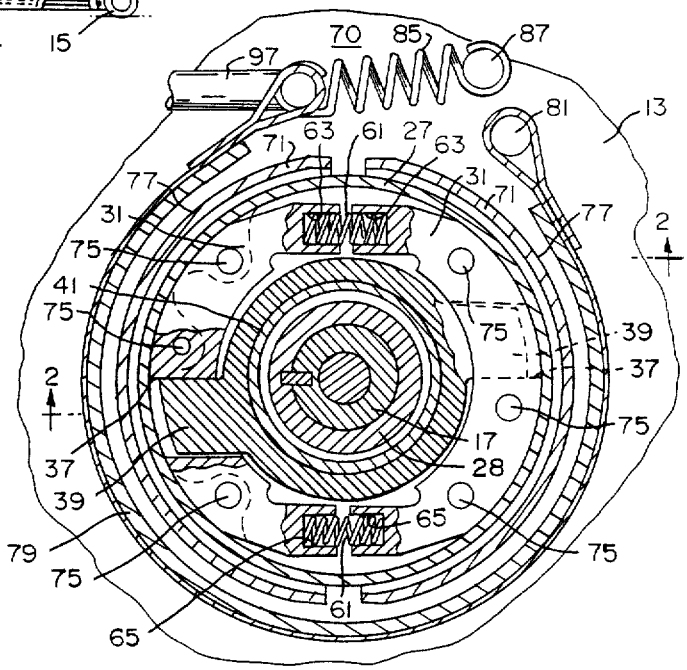
FIG. 3 is a sectional view taken generally along line 3—3 of FIG. 2.
Figure 4:
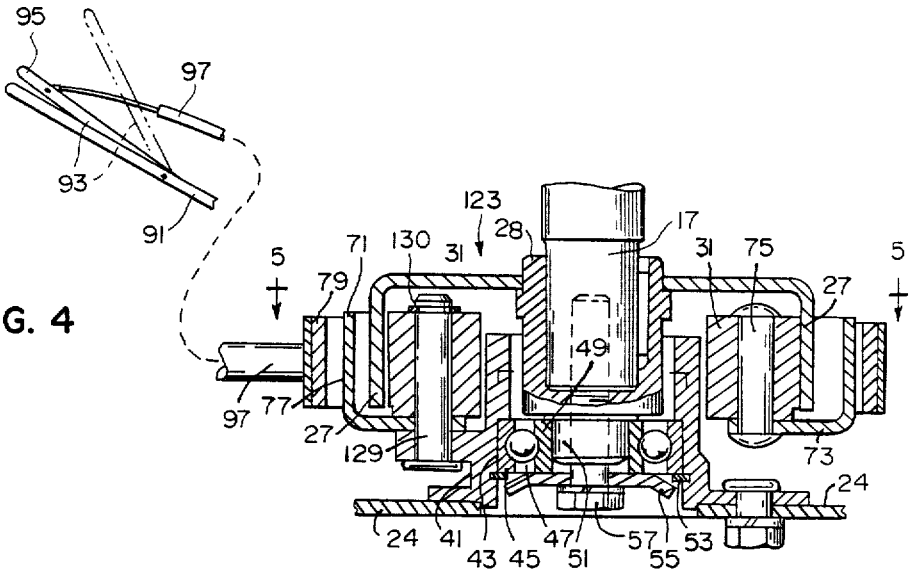
FIG. 4 is an enlarged view, partially schematic and partially in section, of another embodiment of a combined clutch and brake mechanism which can be incorporated in the lawn mower shown in FIG. 1.

Shown in FIG. 4 is another embodiment of a combined clutch and brake mechanism 123 which is similar to that shown in FIGS. 2 and 3 and which can be incorporated in the lawn mower 11 in lieu of the combined clutch and brake mechanism 23. The components of the combined clutch and brake mechanism 123 shown in FIGS. 4 and 5 which are similar to the components of the combined clutch and brake mechanism 23 shown in FIGS. 2 and 3 are designated by the same reference numerals.

Figure 5:
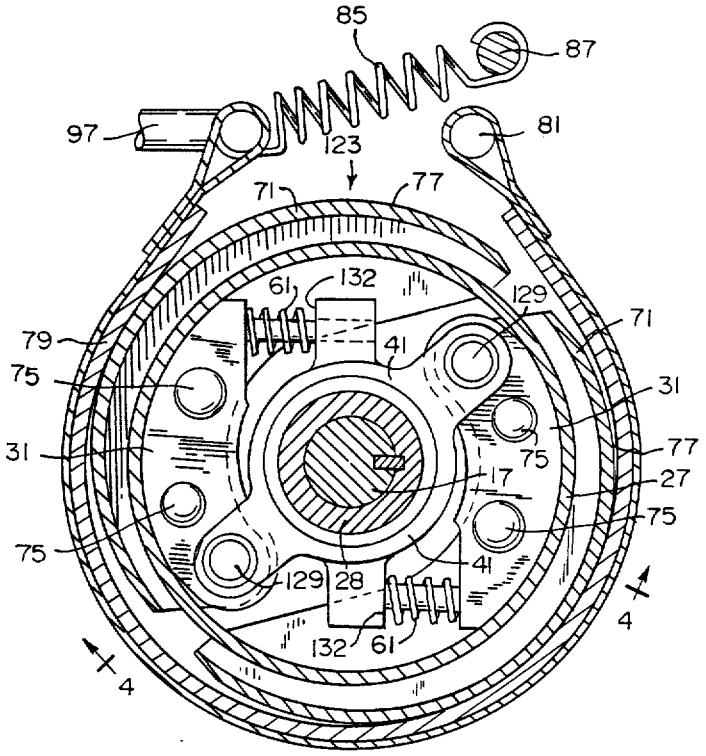
FIG. 5 is a sectional view taken generally along line 5—5 of FIG. 4.

The combined clutch and brake mechanism 123 shown in FIGS. 4 and 5 primarily differs from the construction shown in FIGS. 2 and 3 in that the clutch shoes 31 are carried by the hub 41 about pivots in the form of pins 129 for movement of the clutch shoes 31 to and from the clutch drum engaging position. Retainer rings 130 are snap fitted onto the pins 129 to prevent movement of the clutch shoes 31 axially of the pins 129.

In addition, the springs 61 which bias the clutch shoes 31 into engagement with the clutch drum 27 are engaged, at one end, against the free end of the clutch shoes 31 and, at the other end, against abutments 132 on the hub 41.

The operation of the combined clutch and brake mechanism 123 shown in FIGS. 4 and 5 is essentially similar to that of the combined clutch and brake mechanism shown in FIGS. 2 and 3 with the exception that the clutch shoes 31 pivot outwardly as compared to translating outwardly.

Various of the features of the invention are set forth in the following claims.

What is claimed is:

1. A lawn mower comprising a blade housing supported for travel over the ground, a drive shaft mounted for rotation by said blade housing and including thereon a clutch drum *located in radially outward relation from said drive shaft,* an engine drivingly connected to said drive shaft for rotation thereof, a cutter blade located in said blade housing and mounted for rotation coaxially with and relative to said drive shaft, a clutch shoe connected to said cutter blade for common rotation therewith and for movement relative to a position of engagement with said clutch drum, biasing means urging said clutch shoe into said position of engagement, a brake surface fixed to said clutch shoe, [and] a brake member movable between a first position wherein said brake member is spaced from said brake surface, and a second position wherein said brake member engages said brake surface to brake rotation of said cutter blade and to displace said clutch shoe from said position of engagement against the action of said biasing means, *and means biasing said brake member to said second position and normally overpowering said clutch shoe biasing means.*

[2. A lawn mower in accordance with claim 1 and further including means biasing said brake member to said second position.]

3. A lawn mower in accordance with claim [2] *1* and further including manual means for overpowering said brake member biasing means so as to displace said brake member to said first position.

4. A lawn mower in accordance with claim 1 wherein said cutter blade is supported for rotation from said drive shaft.

5. A lawn mower in accordance with claim 1 wherein said clutch shoe is connected to said cutter blade for pivotal movement relative to said cutter blade.

6. A lawn mower in accordance with claim 5 wherein said cutter blade carries thereon an abutment and wherein said *clutch shoe* biasing means comprises a spring acting between said abutment and said clutch shoe.

7. A lawn mower in accordance with claim 1 wherein said clutch shoe is connected to said cutter blade for translatory movement relative thereto.

8. A lawn mower in accordance with claim 7 and further including a second clutch shoe located in diametrically opposite relation to said first mentioned clutch shoe and connected to said cutter blade for common rotation therewith and for movement relative to a position of engagement with said clutch drum, and wherein said *clutch shoe* biasing means also biases said second clutch shoe to a position of engagement with said clutch drum and comprises a pair of springs acting, at one end, against said first mentioned clutch shoe and acting, at the other end, against said second clutch shoe.

9. A lawn mower in accordance with claim 1 wherein said clutch drum is located radially outwardly of said clutch shoe and extends in generally parallel relation to the axis of drive shaft rotation and wherein said brake surface is located radially outwardly of and in generally parallel relation to said clutch drum.

10. A lawn mower in accordance with claim 9 wherein said brake surface constitutes one leg of an L shaped member including a second leg extending radially inwardly and fastened to said clutch shoe.

[11. A combined brake and clutch mechanism comprising a drive member mounted for rotation and including thereon a clutch drum, a driven member carried for rotation coaxially with and relative to said drive member, a clutch shoe connected to said driven member for common rotation therewith and for movement relative to a position of engagement with said clutch drum, biasing means for urging said clutch shoe toward said position of engagement, a brake surface fixed to said clutch shoe, and a brake member movable between a first position wherein said brake member is spaced from said brake surface, and a second position wherein said brake member engages brake surface to brake rotation of said driven member and to displace said clutch shoe from said position of engagement against the action of said biasing means.]

[12. A combined brake and clutch mechanism in accordance with claim 11 and further including means biasing said brake member to said second position.]

[13. A combined brake and clutch mechanism in accordance with claim 12 and further including manual means for overpowering said brake member biasing means so as to displace said brake member to said first position.]

[14. A lawn mower in accordance with claim 11 wherein said driven member is supported for rotation from said drive member.]

[15. A combined brake and clutch mechanism in accordance with claim 11 wherein said clutch shoe is connected to said driven member for pivotal movement relative to said driven member.]

[16. A combined brake and clutch mechanism in accordance with claim 15 wherein said driven member carries thereon an abutment and wherein said biasing means comprises a spring acting between said abutment and said clutch shoe.]

[17. A combined brake and clutch mechanism in accordance with claim 11 wherein said clutch shoe is connected said driven member for translatory movement relative thereto.]

[18. A combined brake and clutch mechanism in accordance with claim 17 and further including a second clutch shoe located in diametrically opposite relation to said first mentioned clutch shoe and connected to said driven member for common rotation therewith and for movement relative to a position of engagement with said clutch drum, and wherein said biasing means also biases said second clutch shoe to a position of engagement with said clutch drum and comprises and pair of springs acting, at one end, against said first mentioned clutch shoe and acting, at the other end, against said second clutch shoe.]

19. A combined brake and clutch mechanism [in accordance with claim 11 wherein] *comprising a drive member mounted for rotation and including thereon a clutch drum, a driven member carried for rotation coaxially with and relative to said drive member, a clutch shoe connected to said driven member for common rotation therewith and for movement relative to a position of engagement with said clutch drum,* said clutch drum [is] *being* located radially outwardly of said clutch shoe and [extends] *extending* in generally parallel relation to the axis of drive shaft rotation [and wherein], said brake surface [is] *being* located radially outwardly of and in generally parallel relation to said clutch drum, *and a brake member movable between a first position wherein said brake member is spaced from said brake surface, and a second position wherein said brake member engages said brake surface to brake rotation of said driven member and to displace said clutch shoe from said position of engagement against the action of said biasing means.*

20. A combined brake and clutch mechanism in accordance with claim 19 wherein said brake surface constitutes one leg of an L shaped member including a second leg extending radially inwardly and fastened to said clutch shoe.

*21. A lawn mower comprising a blade housing supported for travel over the ground, a drive shaft mounted for rotation by said blade housing and including thereon a clutch drum located in a given radial plane, an engine drivingly connected to said drive shaft for rotation thereof, a cutter blade located in said blade housing and mounted for rotation coaxially with and relative to said drive shaft, clutch shoes carried by said cutter blade for common rotation therewith and movable relative thereto in said plane into and out of clutching engagement with the drum, spring means for effecting movement of said shoes into engagement with the drum to drivingly clutch together said drive shaft and said cutter blade, and a brake band for effecting movement of said shoes out of engagement with said drum and to stop rotation of said cutter blade without interrupting the rotation of said drive shaft, said brake band said spring being generally disposed in and acting in said given plane.*

*22. A lawn mower in accordance with claim 21 wherein said brake band for effecting movement of said shoes out of engagement with said drum and to stop rotation of said cutter blade provides for overcoming the bias of said spring means to effect a disengagement from said drum and may be selectively actuated.ep*

*23. A lawn mower in accordance with claim 21 wherein said spring means are disposed adjacent to said clutch shoes to bias said shoes into engagement with said drum.*

*24. A lawn mower in accordance with claim 21 wherein said brake band extends around said clutch shoes and has one end thereof secured to a fixed anchor and the opposite end thereof secured to a movable anchor, means to move said movable anchor to contract said brake band into contact with said shoes to brake said cutter blade, said brake band being self-energizing upon initial contact with said clutch shoes when the direction of rotation for said clutch shoes in relation to said brake band is from said movable anchor toward said fixed anchor.*

*25. A lawn mower comprising a blade housing supported for travel over the ground, a drive shaft mounted for rotation by said blade housing and including thereon a clutch drum, an engine drivingly connected to said drive shaft for rotation thereof, a cutter blade located in said blade housing and mounted for rotation coaxially with and relative to said drive shaft, clutch shoes carried on said cutter blade and being movable relative thereto into and out of clutching engagement with said drum, means for effecting movement of said shoes into engagement with said drum to drivingly clutch together said drive shaft and said cutter blade, and means for effecting movement of said shoes out of engagement with said drum and to stop rotation of said cutter blade without interrupting the rotation of said drive shaft, said clutch shoes being provided with radially spaced, generally circumferential inner and outer surfaces, said inner surface of each shoe being engageable with said drum and said outer surface being engageable by said means for effecting movement of said shoes out of engagement with said drum.*

*26. A lawn mower in accordance with claim 25 wherein said inner surface of each shoe for engaging the drum is generally symmetrical with respect to the axes of the drive and driven members in the outer drum engaging position of the shoes and the outer surface of each shoe for engagement by the means for effecting movement of said shoes out of engagement with the drum is generally symmetrical with respect to the axes of the drive and driven members in the inner position of the shoes.*

*27. A lawn mower comprising a blade housing supported for travel over the ground, a drive shaft mounted for rotation by said blade housing and including thereon a clutch drum located in a given radial plane, an engine drivingly connected to said drive shaft for rotation thereof, a cutter blade located in said blade housing and mounted for rotation coaxially with and relative to said drive shaft, clutch shoes carried on said cutter blade, said clutch shoes being connected to said cutter blade and being movable radially in said plane relative to said cutter blade into and out of clutching engagement with said drum, means biasing said shoes into engagement with said drum to drivingly clutch together said drive shaft and said cutter blade, and brake means selectively engageable with said clutch shoes to effect a disengagement between said shoes and said drum and to stop said cutter blade without interrupting the rotation of said drive shaft, said selectively engageable brake means for effecting disengagement of said shoes from said drum being generally disposed in and acting in said given plane.*

*28. A lawn mower comprising a blade housing supported for travel over the ground, a drive shaft mounted for rotation by said blade housing and including thereon a clutch drum located in a given radial plane, an engine drivingly connected to said drive shaft for rotation thereof, a cutter blade located in said blade housing and mounted for rotation coaxially with and relative to said drive shaft, clutch shoes carried on said cutter blade, said clutch shoes being connected to said cutter blade and being movable radially in said given plane relative to said cutter blade into and out of clutching engagement with said drum, means biasing said shoes into engagement with said drum to drivingly clutch together said drive shaft and said cutter blade, and means selectively engageable with said clutch shoes to effect a disengagement between said shoes and said drum and to stop said cutter blade without interrupting the rotation of said drive shaft, said means selectively engageable with said clutch shoes to effect a disengagement between said clutch shoes and said drum and to stop said cutter blade comprising a brake band generally disposed in said given plane.*

*29. A lawn mower comprising a blade housing supported for travel over the ground, a drive shaft mounted for rotation by said blade housing and including thereon a clutch*

*drum, an engine drivingly connected to said drive shaft for rotation thereof, a cutter blade located on said blade housing and mounted for rotation coaxially with and relative to said drive shaft, clutch shoes carried on said cutter blade, said clutch shoes being connected to said cutter blade and being movable radially relative to said cutter blade into and out of clutching engagement with said drum, means biasing said shoes into engagement with said drum to drivingly clutch together said drive shaft and said cutter blade, and a brake band radially aligned with said clutch drum and selectively engageable with said clutch shoe to effect a disengagement between said shoes and said drum and to stop said cutter blade without interrupting the rotation of said drive shaft, said brake band extending around said clutch shoes and having one end thereof secured relative to a fixed anchor and the opposite end thereof secured to a movable anchor, said brake band being extended in one position of said movable anchor to avoid contact with said clutch shoes and thus provide for engagement between said shoes and said drum to drivingly clutch together said drive shaft and said cutter blade and being contracted in a second position of said movable anchor to move said clutch shoes inwardly against the force of said biasing means to thus effect disengagement between said shoes and said drum and to stop said cutter blade.*

*30. A lawn mower in accordance with claim 30 wherein said clutch shoes have a generally arcuate recess that opens in the direction of said drum and receives the circumferential flange of said drum, said recesses having a radially outward facing surface for drivingly engaging said drum flange and which are symmetrical with respect to the axes of said drive shaft and said cutter blade to generally match the curvature of said drum flange when said shoes are moved outwardly into driving engagement with said drum flange, said clutch shoes further having an outer arcuate surface engageable by said brake band, said outer arcuate surface of said clutch shoes being generally symmetrical with respect to the axes of said drive shaft and said cutter blade when said clutch shoes are moved to their inward position by said contracted brake band.*

*31. A lawn mower in accordance with claim 29 wherein said movable anchor for said brake band is carried by a pivotally mounted lever movable between a brake band extending position and a brake band contracting position.*

*32. A lawn mower in accordance with claim 31 wherein said pivotally mounted lever carrying said movable anchor for said brake band is biased by spring means toward the brake band contracting position, and control means connected to said lever for selectively moving and holding said lever against the bias of said spring means in the brake band extending position, the biasing force of said spring means serving to return said lever to the brake band contracting position when said control means connected to said lever is selectively released.*

*33. A lawn mower comprising a blade housing supported for travel over the ground, a drive shaft mounted for rotation by said blade housing and including thereon a clutch drum, an engine drivingly connected to said drive shaft for rotation thereof, a cutter blade located in said blade housing and mounted for rotation coaxially with and relative to said drive shaft, clutch shoes carried on said cutter blade and being movable relative thereto into and out of clutching engagement with said drum, means for effecting movement of said shoes into engagement with said drum to drivingly clutch together said drive shaft and said cutter blade, and means for effecting movement of said shoes out of engagement with said drum and to stop rotation of said cutter blade without interrupting the rotation of said drive shaft, said clutch shoes being provided with a pair of radially spaced, generally circumferential surfaces, one of said pair of surfaces being engageable with said drum and the other of said pair of surfaces being engageable by said means for effecting movement of said shoes out of engagement with said drum.*

*34. In a clutch mechanism for disposition between rotatable drive and driven members, a drum carried on said drive member and located in a given radial plane, clutch shoes carried on said driven member and being movable relative thereto in said given plane into and out of clutching engagement with the drum, spring means for effecting movement of said shoes into engagement with the drum to drivingly clutch the drive and driven members together, and a brake band for effecting movement of said shoes out of engagement with the drum and to stop rotation of the driven member without interrupting the rotation of the drive member, said brake band and said spring means for effecting movement of the shoes into engagement with the drum being generally disposed in and acting in said given plane.*

*35. The structure as set forth in claim 34 wherein the brake band for effecting movement of said shoes out of engagement with the drum and to stop rotation of the driven member provides for overcoming the bias of the spring means to effect a disengagement from the drum and may be selectively actuated.*

*36. The structure as set forth in claim 34 wherein said spring means are disposed adjacent to the clutch shoes to bias the shoes into engagement with the drum.*

*37. The structure as set forth in claim 34 wherein the brake band extends around the clutch shoes and has one end thereof secured to a fixed anchor and the opposite end thereof secured to a movable anchor, means to move the movable anchor to contract the brake band into contact with the shoes to brake the driven member, said brake band being self-energizing upon initial contact with the clutch shoes when the direction of rotation for the clutch shoes in relation to the brake band is from the movable anchor toward the fixed anchor.*

*38. In a clutch mechanism for disposition between rotatable drive and driven members, a drum carried on said drive member, clutch shoes carried on said driven member and being movable relative thereto into and out of clutching engagement with the drum, means for effecting movement of said shoes into engagement with the drum to drivingly clutch the drive and driven members together, and means for effecting movement of said shoes out of engagement with the drum and to stop rotation of the driven member without interrupting the rotation of the drive member, said clutch shoes being provided with radially spaced, generally circumferential inner and outer surfaces, the inner surface of each shoe being engageable with the drum and the outer surface being engageable by the means for effecting movement of said shoes out of engagement with the drum.*

*39. The structure as set forth in claim 38 wherein the inner surface of each shoe for engaging the drum is generally symmetrical with respect to the axes of the drive and driven members in the outer drum engaging position of the shoes and the outer surface of each shoe for engagement by the means for effecting movement of said shoes out of engagement with the drum is generally symmetrical with respect to the axes of the drive and driven members in the inner position of the shoes.*

*40. In a clutch mechanism for disposition between rotatable drive and driven members, a drum carried on said drive member and located in a given radial plane, clutch*

*shoes carried on said driven member, said clutch shoes being connected to the driven member and being movable radially in said given plane relative to the driven member into and out of clutching engagement with the drum, means biasing said shoes into engagement with the drum to drivingly clutch the drive and driven members together, and brake means selectively engageable with the clutch shoes to effect a disengagement between said shoes and the drum and to stop said driven member without interrupting the rotation of said drive member, said biasing means for effecting movement of the shoes into engagement with the drum and said selectively engageable brake means for effecting disengagement of the shoes from the drum being generally disposed in and acting in said given plane.*

*41. The structure as set forth in claim 40 wherein the means biasing said shoes into engagement with the drum comprises spring means which exerts its biasing force outwardly on the clutch shoes.*

*42. In a clutch mechanism for disposition between rotatable drive and driven members, a drum carried on said drive member and located in a given radial plane, clutch shoes carried on said driven member, said clutch shoes being connected to the driven member and being movable radially in said given plane relative to the driven member into and out of clutching engagement with the drum, means biasing said shoes into engagement with the drum to drivingly clutch together the drive and driven members, and means selectively engageable with the clutch shoes to effect a disengagement between said shoes and the drum and to stop said driven member without interrupting the rotation of said drive member, said means selectively engageable with the clutch shoes to effect a disengagement between the clutch shoes and the drum and to stop the driven member comprises a brake band generally disposed in said given plane.*

*43. In a clutch mechanism for disposition between rotatable drive and driven members, a drum carried on said drive member, clutch shoes carried on said driven member, said clutch shoes being connected to the driven member and being movable radially relative to the driven member into and out of clutching engagement with the drum, means biasing said shoes into engagement with the drum to drivingly clutch together the drive and driven members, and a brake band selectively engageable with the clutch shoes to effect a disengagement between said shoes and the drum and to stop said driven member without interrupting the rotation of said drive member, said brake band radially aligned with said clutch drum and extending around the clutch shoes and having one end thereof secured relative to a fixed anchor and the opposite end thereof secured to a movable anchor, said brake band being extended in one position of the movable anchor to avoid contact with the clutch shoes and thus provide for engagement between said shoes and the drum to drivingly clutch together the drive and driven members and being contracted in a second position of the movable anchor to move the clutch shoes inwardly against the force of the biasing means to thus effect disengagement between said shoes and the drum and to stop said driven member.*

*44. The structure as set forth in claim 45 wherein the clutch shoes have a generally arcuate recess that opens in the direction of the drum and receives the circumferential flange of the drum, said recesses having a radially outward facing surface for drivingly engaging the drum flange and which are symmetrical with respect to the axes of the drive and driven members to generally match the curvature of the drum flange when the shoes are moved outwardly into driving engagement with the drum flange, said clutch shoes further having an outer arcuate surface engageable by the brake band, said outer arcuate surface of said clutch shoes being generally symmetrical with respect to the axes of the drive and driven members when the clutch shoes are moved to their inward position by the contracted brake band.*

*45. The structure as set forth in claim 43 wherein the movable anchor for the brake band is carried by a pivotally mounted lever movable between the brake band extending position and a brake band contracting position.*

*46. The structure as set forth in claim 45 wherein the pivotally mounted lever carrying the movable anchor for the brake band is biased by spring means toward the brake band contracting position, and control means connected to the lever for selectively moving and holding the lever against the bias of the spring means in the brake band extending position, the biasing force of the spring means serving to return the lever to the brake band contracting position when the control means connected to the lever is selectively released.*

*47. In a clutch mechanism for disposition between rotatable drive and driven members, a drum carried on said drive member, clutch shoes carried on said driven member and being movable relative thereto into and out of clutching engagement with the drum, means for effecting movement of said shoes into engagement with the drum to drivingly clutch the drive and driven members together, and means for effecting movement of said shoes out of engagement with the drum and to stop rotation of the driven member without interrupting the rotation of the drive member, said clutch shoes being provided with a pair of radially spaced, generally circumferential surfaces, one of said pair of surfaces being engageable with the drum and the other of said pair of surfaces being engageable by the means for effecting movement of said shoes out of engagement with the drum.*

*48. A clutch mechanism compressing a rotatable drive member, a driven member, a drum carried on said drive member and located in a given radial plane, clutch shoes carried on said driven member for common rotation therewith and movable relative thereto in said given plane into and out of clutching engagement with said drum, means for effecting movement of said shoes into engagement with said drum to drivingly clutch together said drive and driven members, and a brake band for effecting movement of said shoes out of engagement with said drum and to stop rotation of said driven member without interrupting the rotation of said drive member, said brake band and means for effecting movement of said shoes into engagement with said drum being generally disposed in and acting in said given plane.*

*49. A clutch mechanism comprising a rotatable drive member, a driven member, a drum carried on said drive member and located in a given radial plane, clutch shoes carried on said driven member for common rotation therewith and movable radially in said given plane relative to said driven member into and out of clutching engagement with said drum, means biasing said shoes into engagement with said drum to drivingly clutch together said drive and driven members, and brake means selectively engageable with said clutch shoes to effect a disengagement between said shoes and said drum and to stop said driven member without interrupting the rotation of said drive member, and said selectively engageable brake means for effecting disengagement of said shoes from said drum being generally disposed in and acting in said given plane.*

*50. A clutch mechanism comprising a rotatable drive member, a driven member, a drum carried on said drive member and located in a given radial plane, clutch shoes*

*carried on said driven member for common rotation therewith and movable radially relative to said driven member into and out of clutching engagement with said drum, means biasing said shoes into engagement with said drum to drivingly clutch together said drive and driven members, and means selectively engageable with said clutch shoes to effect a disengagement between said shoes and said drum and to stop said driven member without interrupting the rotation of said drive member, said means selectively engageable with said clutch shoes to effect a disengagement between said clutch shoes and said drum and to stop said driven member comprising a brake band generally disposed in said given plane.*

*51. A clutch mechanism comprising a rotatable drive member, a driven member, a drum carried on said drive member, clutch shoes carried on said driven member for common rotation therewith and movable radially relative to said driven member into and out of clutching engagement with said drum, means biasing said shoes into engagement with said drum to drivingly clutch together said drive and driven members, and a brake band radially aligned with said clutch drum and selectively engageable with said clutch shoes to effect a disengagement between said shoes and said drum and to stop said driven member without interrupting the rotation of said drive member, said brake band extending around said clutch shoes and having one end thereof secured relative to a fixed anchor and the opposite end thereof secured to a movable anchor, said brake band being extended in one position of said movable anchor to avoid contact with said clutch shoes and thus provide for engagement between said shoes and said drum to drivingly clutch said drive and driven members together and being contracted in a second position of said movable anchor to move said clutch shoes inwardly against the force of said biasing means to thus effect disengagement between said shoes and said drum and to stop said driven member.*

*52. In a clutch mechanism for disposition between rotatable drive and driven members, a drum carried on said drive member, a clutch shoe carried on said driven member and movable relative thereto and out of clutching engagement with the drum, means for effecting movement of said shoe into engagement with the drum to drivingly clutch the drive and driven members together, and means for effecting movement of said shoe out of engagement with the drum and to stop rotation of the driven member without interrupting the rotation of the drive member, said clutch shoe being provided with a pair of radially spaced, generally circumferential surfaces, one of said pair of surfaces being engageable with the drum and the other of said pair of surfaces being engageable by the means for effecting movement of said shoe out of engagement with the drum.*

*53. A clutch mechanism comprising a rotatable drive member, a driven member, a drum carried on said drive member and located in a given radial plane, a clutch shoe carried on said driven member for common rotation therewith and movable in said given plane relative to said driven member into and out of clutching engagement with said drum, means for effecting movement of said shoe into engagement with said drum to drivingly clutch together said drive and driven members, and means for disengaging said shoe and said drum and for stopping rotation of said driven member without interrupting the rotation of said drive member, said means for disengaging said clutch shoe and said drum and for stopping said driven member comprising a brake generally disposed in said given plane.*

*54. A clutch mechanism comprising a rotatable drive member, a driven member, a drum carried on said drive member, a clutch shoe carried on said driven member for common rotation therewith and movable relative to said driven member into and out of clutching engagement with said drum, means biasing said shoe into engagement with said drum to drivingly clutch together said drive and driven members, and a brake band radially aligned with said clutch drum and selectively engageable with said clutch shoe to effect a disengagement between said shoe and said drum and to stop said driven member without interrupting the rotation of said drive member, said brake band extending around said clutch shoe and having one end thereof secured relative to a fixed anchor and the opposite end thereof secured to a movable anchor, said brake band being extended in one position of said movable anchor to avoid contact with said clutch shoe and thus provide for engagement between said shoe and said drum to drivingly clutch said drive and driven members together and being contracted in a second position of said movable anchor to move said clutch shoe inwardly against the force of said biasing means to thus effect disengagement between said shoe and said drum and to stop said driven member.*

*55. A combined brake and clutch mechanism comprising a drive member mounted for rotation and including thereon a clutch drum, a driven member carried for rotation coaxially with and relative to said drive member, a clutch shoe connected to said driven member for common rotation therewith and for movement relative to a position of engagement with said clutch drum, said clutch drum being located radially outwardly of said clutch shoe and extending in generally parallel relation to the axis of drive shaft rotation, biasing means for urging said clutch shoe toward said position of engagement, a brake surface fixed to said clutch shoe, said brake surface being located radially outwardly of and in generally parallel relation to said clutch drum, a brake member movable between a first position wherein said brake member is spaced from said brake surface, and a second position wherein said brake member engages said brake surface to brake rotation of said driven member and to displace said clutch shoe from said position of engagement against the action of said biasing means, and means biasing said brake member to said second position and normally overpowering said clutch shoe biasing means.*

*56. A combined brake and clutch mechanism in accordance with claim 55 wherein said brake surface constitutes one leg of an L shaped member including a second leg extending radially inwardly and fastened to said clutch shoe.*

*57. A lawn mower comprising a blade housing supported for travel over the ground, a drive shaft mounted for rotation by said blade housing and including thereon a clutch drum, an engine drivingly connected to said drive shaft for rotation thereof, a cutter blade located in said blade housing and mounted for rotation coaxially with and relative to said drive shaft, a clutch shoe connected to said cutter blade for common rotation therewith and for movement relative to a position of engagement with said clutch, said clutch drum being located radially outwardly of said clutch shoe and extending in generally parallel relation to the axis of drive shaft rotation, biasing means for urging said clutch shoe toward said position of engagement, a brake surface fixed to said clutch shoe, said brake surface being located radially outwardly of and in generally parallel relation to said clutch drum, and a brake member movable between a first position wherein said brake member is spaced from said brake surface, and a second position wherein said brake member engages said brake surface to brake rotation of said cutter blade and to displace said*

*clutch shoe from said position of engagement against the action of said biasing means.*

*58. A lawn mower in accordance with claim 57 wherein said brake surface constitutes one leg of an L shaped member including a second leg extending radially inwardly and fastened to said clutch shoe.*

*59. A lawn mower comprising a blade housing supported for travel over the ground, a drive shaft mounted for rotation by said blade housing and including thereon a clutch input located in radially outward relation from said drive shaft, an engine drivingly connected to said drive shaft for rotation thereof, a cutter blade located in said blade housing and mounted for rotation coaxially with and relative to said drive shaft, a clutch output connected to said cutter blade for common rotation therewith and for movement relative to a position of engagement with said clutch input, biasing means urging said clutch output into said position of engagement, a brake surface fixed to said clutch output, a brake member movable between a first position wherein said brake member is spaced from said brake surface, and a second position wherein said brake member engages said brake surface to brake rotation of said cutter blade and to displace said clutch output from said position of engagement against the action of said biasing means, and means biasing said brake member to said second position and normally overpowering said clutch output biasing means.*

*60. A lawn mower in accordance with claim 59 further including manual means for overpowering said brake member biasing means so as to displace said brake member to said first position.*

*61. A lawn mower in accordance with claim 59 wherein said cutter blade is supported for rotation from said drive shaft.*

*62. A combined brake and clutch mechanism comprising a drive member mounted for rotation and including thereon a clutch drum located in radial outward relation from said drive member, a driven member carried for rotation coaxially with and relative to said drive member, a clutch shoe connected to said driven member for common rotation therewith and for movement relative to a position of engagement with said clutch drum, biasing means for urging said clutch shoe toward said position of engagement, a brake surface fixed to said clutch shoe, a brake member movable between a first position wherein said brake member is spaced from said brake surface, and a second position wherein said brake member engages said brake surface to brake rotation of said driven member and to displace said clutch shoe from said position of engagement against the action of said biasing means, and means biasing said brake member to said second position and normally overpowering said brake shoe biasing means.*

*63. A combined brake and clutch mechanism in accordance with claim 62 and further including manual means for overpowering said brake member biasing means so as to displace said brake member to said first position.*

*64. A lawn mower in accordance with claim 63 wherein said driven member is supported for rotation from said drive member.*

*65. A combined brake and clutch mechanism comprising a drive member mounted for rotation and including thereon a first clutch member, a driven member carried for rotation coaxially with and relative to said drive member, a second clutch member connected to said driven member for common rotation therewith and for movement relative to a position of engagement with said first clutch member, biasing means for urging said second clutch member toward said position of engagement, a brake surface fixed to said second clutch member, a brake member movable between a first position wherein said brake member is spaced from said brake surface, and a second position wherein said brake member engages said brake surface to brake rotation of said driven member and to displace said second clutch member from said position of engagement against the action of said biasing means, and means biasing said brake member to said second position and normally overpowering said brake shoe biasing means.*

*66. A combined brake and clutch mechanism in accordance with claim 65 and further including manual means for overpowering said brake member biasing means so as to displace said brake member to said first position.*

*67. A lawn mower in accordance with claim 65 wherein said driven member is supported for rotation from said drive member.*

* * * * *